US011110859B2

(12) United States Patent
Morotomi et al.

(10) Patent No.: US 11,110,859 B2
(45) Date of Patent: Sep. 7, 2021

(54) VEHICLE NOTIFICATION APPARATUS

(71) Applicant: TOYOTA JIDOSHA KABUSHIKI KAISHA, Toyota (JP)

(72) Inventors: Kohei Morotomi, Nagoya (JP); Tomohiro Tanaka, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/152,878

(22) Filed: Jan. 20, 2021

(65) Prior Publication Data
US 2021/0229600 A1    Jul. 29, 2021

(30) Foreign Application Priority Data
Jan. 24, 2020  (JP) .............................. JP2020-009684

(51) Int. Cl.
*B60Q 9/00*  (2006.01)
*B60K 35/00*  (2006.01)

(52) U.S. Cl.
CPC ................ *B60Q 9/00* (2013.01); *B60K 35/00* (2013.01); *B60K 2370/167* (2019.05)

(58) Field of Classification Search
None
See application file for complete search history.

(56) References Cited

U.S. PATENT DOCUMENTS

| 3,806,868 | A  | * | 4/1974 | Portman | ............... | B60Q 11/007 340/457 |
| 6,933,838 | B2 | * | 8/2005 | Yamaki | .................... | B60Q 1/34 340/384.1 |
| 7,394,355 | B2 | * | 7/2008 | Sjonell | .................. | G01S 7/4811 340/435 |
| 7,859,432 | B2 | * | 12/2010 | Kim | ...................... | G01S 7/4813 340/937 |
| 8,170,788 | B2 | * | 5/2012 | Sjogren | ................ | G05D 1/0246 701/301 |

(Continued)

FOREIGN PATENT DOCUMENTS

JP  2004280453 A  10/2004
JP  2018156253 A  10/2018

*Primary Examiner* — Chico A Foxx
(74) *Attorney, Agent, or Firm* — Dickinson Wright, PLLC

(57) ABSTRACT

The vehicle notification apparatus comprises: an operation element operated by a driver to activate a turn signal indicator; an information obtaining device that obtains information on an object around the vehicle; an auditory notification device configured to give an auditory notification; a visual notification device configured to give a visual notification; and a control unit. The control unit is configured to: perform a both-notification to let both of the auditory and the visual notification devices perform the respective notifications, until a both-notification completion condition becomes satisfied from when it is determined for the first time that the obstacle is present in a period where the signal indicator is being activated; and perform a single-notification to let the visual notification device perform the notification without activating the auditory notification device, when the obstacle is determined to be present after the both-notification completion condition becomes satisfied, in the above-described period.

5 Claims, 13 Drawing Sheets

(56) References Cited

U.S. PATENT DOCUMENTS

| | | | | |
|---|---|---|---|---|
| 8,294,565 | B1* | 10/2012 | Thomas | B60Q 1/34 340/472 |
| 9,381,916 | B1* | 7/2016 | Zhu | G01S 17/931 |
| 9,481,300 | B1* | 11/2016 | Lutawan | B60Q 9/008 |
| 10,214,146 | B1* | 2/2019 | Martinez Romero | B60R 11/00 |
| 2005/0017858 | A1* | 1/2005 | Gross | B60Q 9/008 340/435 |
| 2008/0129481 | A1* | 6/2008 | Zumbrunnen | B60Q 9/00 340/457 |
| 2010/0073152 | A1* | 3/2010 | Nagamine | G08G 1/167 340/425.5 |
| 2014/0077939 | A1* | 3/2014 | Hong | H04N 7/181 340/435 |
| 2014/0091920 | A1* | 4/2014 | Thompson | B60Q 1/38 340/475 |
| 2017/0210282 | A1* | 7/2017 | Rodriguez Barros | B60Q 1/484 |
| 2018/0065482 | A1* | 3/2018 | Yagyu | B60K 35/00 |
| 2018/0268702 | A1 | 9/2018 | Morotomi et al. | |
| 2019/0057606 | A1* | 2/2019 | Skvarce | G08G 1/166 |

* cited by examiner

VEHICLE NOTIFICATION APPARATUS

TECHNICAL FIELD

The present disclosure relates to a vehicle notification apparatus configured to notify a driver of a vehicle of a presence of an obstacle in a period in which a turn signal indicator is being activated (or working/blinking).

BACKGROUND

There have been known vehicle notification apparatuses configured to notify a driver of a vehicle of a presence of an obstacle in a period in which a turn signal indicator is being working (blinking).

For example, a vehicle notification apparatus (hereinafter, referred to as a "conventional apparatus") disclosed in Japanese Patent Application Laid-Open (kokai) No. 2004-280453 is configured to give a visual notification and an auditory notification when the conventional apparatus determines that the obstacle is present in a period in which a turn signal indicator is being working (blinking).

As the visual notification, a display element for alerting the driver of a likelihood of a collision is displayed on a combination meter. As the auditory notification, an alerting sound is generated from a buzzer.

SUMMARY

A driver's attentiveness to the obstacle can be enhanced when both of the visual notification and the auditory notification are given according to the conventional apparatus, however, it is likely that the conventional apparatus continues giving the auditory notification when the vehicle is in a heavy traffic intersection. Thus, the driver may feel annoyed with the continuous auditory notification.

The present disclosure is made to cope with the problem described above. Thus, one of the objectives of the present disclosure is to provide a vehicle notification apparatus that is capable of appropriately notifying the driver to alert him/her to the obstacle without making him/her feel annoyed with the notification.

A vehicle notification apparatus (referred to as a "present disclosed apparatus") of the present disclosure comprises:

an operation element (36) operated by a driver of a vehicle in order for the driver to activate a turn signal indicator (40L, 40R) so as to indicate a turn direction (including a left turn or a left turn) of the vehicle;

an information obtaining device (32, 34) configured to obtain surrounding information including information on an object present around the vehicle;

an auditory notification device (50) configured to be able to perform/give an auditory notification to the driver;

a visual notification device (60) configured to be able to perform/give a visual notification to the driver; and a control unit (20) configured to:

determine, based on the surrounding information, whether or not an obstacle that has a likelihood of colliding with the vehicle is present every time a predetermined time elapses (step 515), in a period in which the turn signal indicator is being activated (step 505: Yes);

perform a both-notification to let both of the auditory notification device and the visual notification device perform the auditory notification and the visual notification, respectively, until a predetermined both-notification completion condition becomes satisfied (step 625, step 700 to step 795) from a time point at which it is determined for the first time that the obstacle is present after the turn signal indicator starts to be activated in the period in which the turn signal indicator is being activated (step 610: Yes, step 615: Yes); and perform a single-notification to let the visual notification device perform the visual notification without letting the auditory notification device perform the auditory notification, when it is again determined that the obstacle is present after the both-notification completion condition becomes satisfied (step 610: Yes, step 615: No, step 635: Yes), in the period in which the turn signal indicator is being activated.

In some embodiments, the control unit is configured to: determine that the both-notification completion condition becomes satisfied (step 725) when a predetermined notification time length elapses from a start of the both-notification (step 715: No).

In some embodiments, the control unit is configured to: determine that the both-notification completion condition becomes satisfied (step 1205) and perform the single-notification (step 640 shown in FIG. 12, step 815: Yes, step 820), when it is again determined that the obstacle is present after a start of the both-notification (step 605 shown in FIG. 12: Yes, step 610 shown in FIG. 12: Yes, step 615 shown in FIG. 12: No).

In the period (i.e., turn signal indicator activation period) in which the turn signal indicator is being activated, the present disclosed apparatus performs/gives the both-notification when the obstacle is determined to be present for the first time, and performs/gives the single-notification when the obstacle is determined to be present after the both-notification completion condition becomes satisfied. Accordingly, in the turn signal indicator activation period, the notification is given by the auditory notification device in the beginning, however, is not given afterward. The present disclosed apparatus can increase the ability/possibility of letting the driver pay attention to the obstacle and can decrease the possibility that the driver feels annoyed with the auditory notification given by the auditory notification device.

In some embodiments, the control unit is configured to: perform again the both-notification (step 1130, step 705: Yes, step 715: Yes, step 720), when it is determined that the obstacle is present (step 1120: Yes, step 1125: Yes), after a state where no obstacle is determined to be present continues for a predetermined time or more after the both-notification completion condition becomes satisfied (step 915: Yes, step 930: Yes, step 935), in the period in which the turn signal indicator is being activated.

When the state where no obstacle is determined to be present continues for the predetermined time or more after the both-notification completion condition becomes satisfied, the driver's attentiveness to the obstacle, that was once increased by the both-notification, may often decrease. In view of the above, the control unit starts to perform the both-notification again when it is determined that the obstacle is present after the state where no obstacle is determined to be present continues for the predetermined time. Therefore, the driver's attentiveness to the obstacle can be again increased/enhanced.

In some embodiments, the present disclosed apparatus further comprises a driver monitoring camera device (38) configured to obtain image data of the driver sitting on a driver's seat of the vehicle. In this case, the control unit is configured to:

perform again the both-notification (step 1130, step 705: Yes, step 715: Yes, step 720), when it is determined that the obstacle is present (step 1120: Yes, step 1125: Yes) after it is determined, based on image data of the driver, that the driver looks in a predetermined direction other than a direction to which the driver should pay attention (i.e., the drive looks away) after the both-notification completion condition becomes satisfied (step 1025: Yes, step 1030; Yes), in the period in which the turn signal indicator is being activated.

When the driver looks away after the both-notification completion condition becomes satisfied, the driver's attentiveness to the obstacle is likely to be low. Whereas, the present disclosed apparatus in some embodiments performs the both-notification again when it is determined that the driver looks away and that the obstacle is present. Therefore, the driver's attentiveness to the obstacle can be again increased/enhanced.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION

Figure 1:
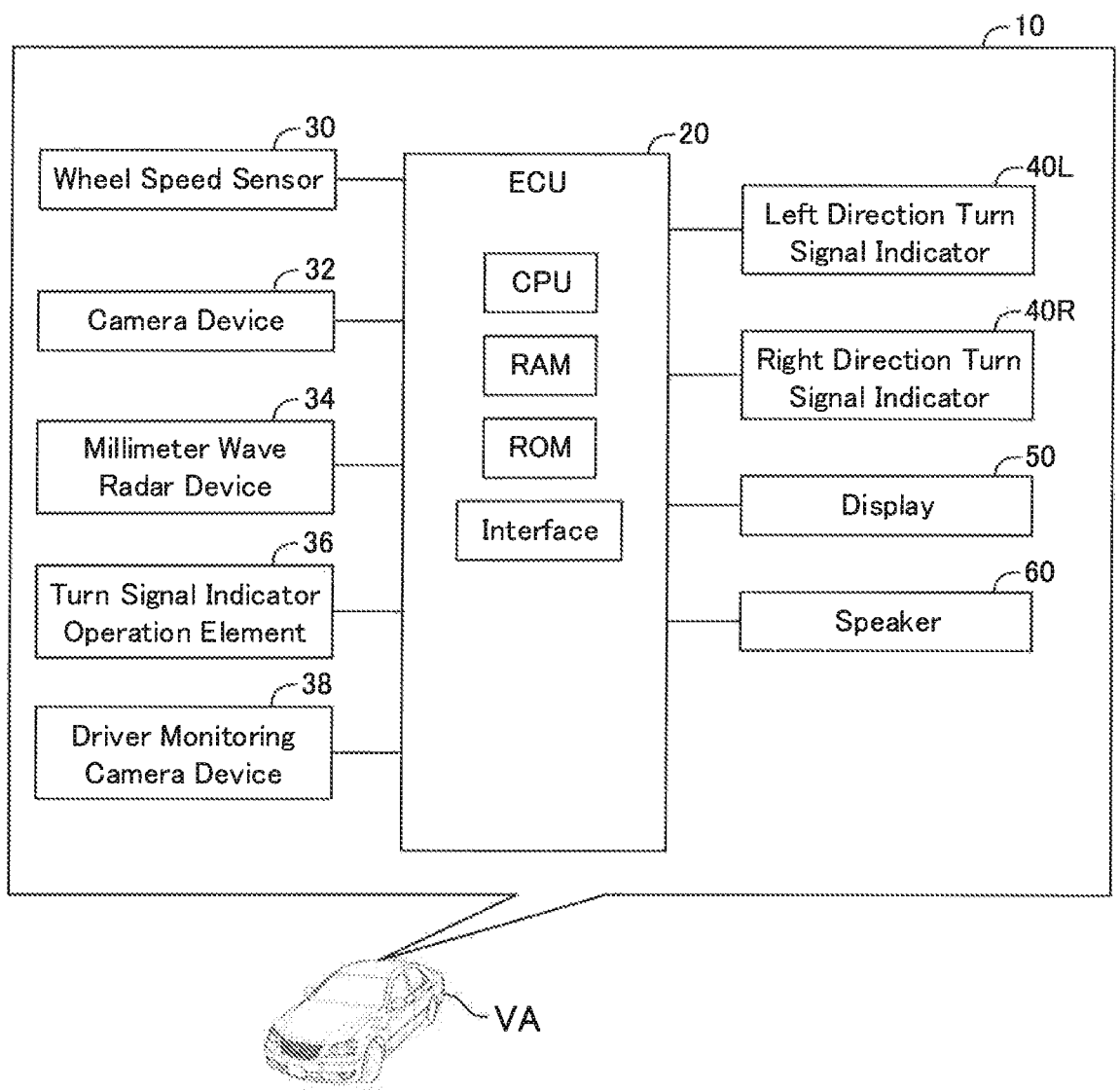
FIG. 1 is a schematic diagram of a vehicle notification apparatus (present notification apparatus) according to an embodiment of the present disclosure.

A vehicle notification apparatus (hereinafter, sometimes referred to as a "present notification apparatus") according to an embodiment of the present disclosure will be described. As shown in FIG. 1, the present notification apparatus 10 is applied to and installed on a vehicle VA.

The present notification apparatus 10 comprises an ECU 20. ECU is an abbreviation of Electronic Control Unit. The ECU 20 is a electronic control circuit that comprises, as a main component, a microcomputer. The microcomputer includes a CPU, a ROM, a RAM, and an interface I/F. The CPU achieves various functions through executing instructions (or programs/routines) stored in the ROM. A part of functions that the ECU 20 has may be realized/achieved by an unillustrated another ECU.

The present notification apparatus 10 comprises a plurality of wheel speed sensors 30, a camera device 32, a millimeter wave radar device 34, a turn signal indicator operation element/device (hereinafter, referred to as an "operation element") 36, a driver monitoring camera device (hereinafter, referred to as a "monitoring camera device") 38, a left direction turn signal indicator 40L, a right direction turn signal indicator 40R, a display 50, and a speaker 60. All of them are connected to the ECU 20.

The wheel speed sensors 30 are provided to respective wheels of the vehicle VA. Each of the wheel speed sensors 30 is configured to generate a single wheel pulse signal every time a corresponding wheel of the wheels rotates by a predetermined angle. The ECU 20 counts the number of the wheel pulse signal transmitted from each of the wheel speed sensors 30 per unit time, and obtains a rotational wheel speed of each of the wheels based on the counted number. The ECU 20 obtains a vehicle speed Vs indicative of a speed of the vehicle VA based on the rotational wheel speed of each of the wheels. For example, the ECU 20 obtains an average of the rotational wheel speed of the four wheels, and obtains the vehicle speed Vs based on the average.

The camera device 32 is disposed at an upper part of a front windshield and in a cabin of the vehicle VA. The camera device 32 photographs (take a picture of) an area in front of the vehicle VA that is referred to as a "front area" every time a predetermined time elapses, so as to obtain image data representing an image (camera image) of the front area. The camera device 32 obtains "object information" and "information on white lines (i.e., lane marker) that defines a lane in which the vehicle VA is traveling", based on the camera image. The object information obtained by the camera device 32 includes a distance between the vehicle VA and an object, and a relative speed of the object with respect to the vehicle VA. For example, the camera device 32 includes a stereo camera device.

The millimeter wave radar device 34 is arranged at a front end of the vehicle VA and in the vicinity of a center of the vehicle VA in a vehicle width direction. The millimeter wave radar device 34 radiates a millimeter wave that propagates in a predetermined area in front of (ahead of) the vehicle, every time a predetermined time elapses. The millimeter wave is reflected by an object such as an other vehicle, a pedestrian, a motorcycle, and a bicycle. The millimeter wave radar device 34 receives the reflected wave, and obtains object information based on the radiated millimeter wave and the received reflected wave. The object information obtained by the millimeter wave radar device 34 includes a distance between the object and the vehicle VA, a relative speed of the object with respect to the vehicle VA, and a direction of the object with respect to the vehicle VA.

It should be noted that the ECU 20 corrects/modifies the object information (hereinafter, referred sometimes to as "radar object information") obtained by the millimeter wave radar device 34 with the object information (hereinafter, referred sometimes to as "camera object information") obtained by the camera device 32, so as to obtain final object information that is used to detect an obstacle described later. The radar object information and the camera object information are collectively referred to as "peripheral/surrounding information".

The operation element 36 is a turn signal lever that is rotatably supported by an unillustrated member (e.g., a steering column) in the vicinity of a steering wheel in such a manner that the lever can be rotated within a predetermined angle. The operation element 36 extends rightward from the member in the vicinity of the steering wheel. When the driver once operates the operation element 36 so as to move the operation element 36 upward from a neutral position, and thus, the operation element 36 reaches a first position, the left direction turn signal indicator 40L described later is activated (blinks) until a time point at which the driver returns the operation element 36 to the neutral position or a time point at which the steering wheel rotates rightward by a predetermined angle so that the operation element 36 returns to the neutral position. Whereas, when the driver once operates the operation element 36 so as to move the operation element 36 downward from the neutral position, and thus, the operation element 36 reaches a second position, the right direction turn signal indicator 40R described later is activated (blinks) until a time point at which the driver returns the operation element 36 to the neutral position or a time point at which the steering wheel rotates leftward by a predetermined angle so that the operation element 36 returns to the neutral position.

The monitoring camera device 38 photographs (take a picture of) a head part including a face of the driver sitting on a driver's seat of the vehicle VA every time a predetermined time elapses, so as to obtain image data of the driver. The image data obtained by the monitoring camera device 38 is hereinafter referred to as a "driver image data".

As described above, the left direction turn signal indicator 40L is activated (blinks) when the operation element 36 is operated so as to move upward from the neutral position. The right direction turn signal indicator 40R is activated (blinks) when the operation element 36 is operated so as to move downward from the neutral position. The blinking left direction turn signal indicator 40L can inform people around the vehicle VA that vehicle VA is about to make a left turn. The blinking right direction turn signal indicator 40R can inform people around the vehicle VA that vehicle VA is about to make a right turn.

The display 50 is arranged at a position of the vehicle VA so as to be seen by (or be visible to) the driver. For example, the display 50 is a display of a so-called navigation system. The display 50 may sometimes be referred to as a "visual notification device". The speaker 60 is arranged in the cabin of the vehicle VA and can generate an alert sound. The speaker 60 may sometimes be referred to as a "auditory notification device".

(Outline of Operation)

An outline of operation of the present notification apparatus 10 will next be described with reference to FIGS. 2 and 3. In an example shown in FIGS. 2 and 3, the vehicle has stopped at a position just before (without entering) an intersection and is going to make a right turn at the intersection. In addition, the right direction turn signal indicator 40R of the vehicle VA is blinking.

In a case where either one of the left direction turn signal indicator 40L and the right direction turn signal indicator 40R is blinking, the ECU 20 determines whether or not an obstacle is present based on the final object information every time a predetermined time elapses. The obstacle means an object that has a likelihood (high possibility) of colliding with the vehicle VA or of approaching too closely to the vehicle VA, if the vehicle VA makes a turn in a direction indicated/specified by the blinking turn signal indicator (i.e., either one of the blinking indicator 40L and the blinking indicator 40R).

Next, a process for detecting the obstacle will be described.

When the right direction turn signal indicator 40R is blinking, the ECU 20 detects, as the obstacle, an object positioned/located in a right detection area RDA, every time the predetermined time elapses. The right detection area RDA is a rectangular area having a first side and a second side. The first side extends from a front right end FRE of the vehicle VA in a vehicle width direction of the vehicle VA, and has a length Wda. The second side extends from the front right end FRE of the vehicle VA in a front-rear direction of the vehicle VA, and has a length Lda.

Whereas, when the left direction turn signal indicator 40L is blinking, the ECU 20 detects, as the obstacle, an object positioned/located in a left detection area LDA, every time the predetermined time elapses. The left detection area LDA is a rectangular area having a third side and a fourth side. The third side extends from a front left end FLE of the vehicle VA in the vehicle width direction of the vehicle VA, and has the length Wda. The fourth side extends from the front left end FLE of the vehicle VA in the front-rear direction of the vehicle VA, and has the length Lda. It should be noted that the ECU 20 may vary the length Wda and/or the length Lda in such a manner that the length Wda and/or the length Lda are/is longer as the vehicle speed Vs of the vehicle VA is higher.

Figure 2:
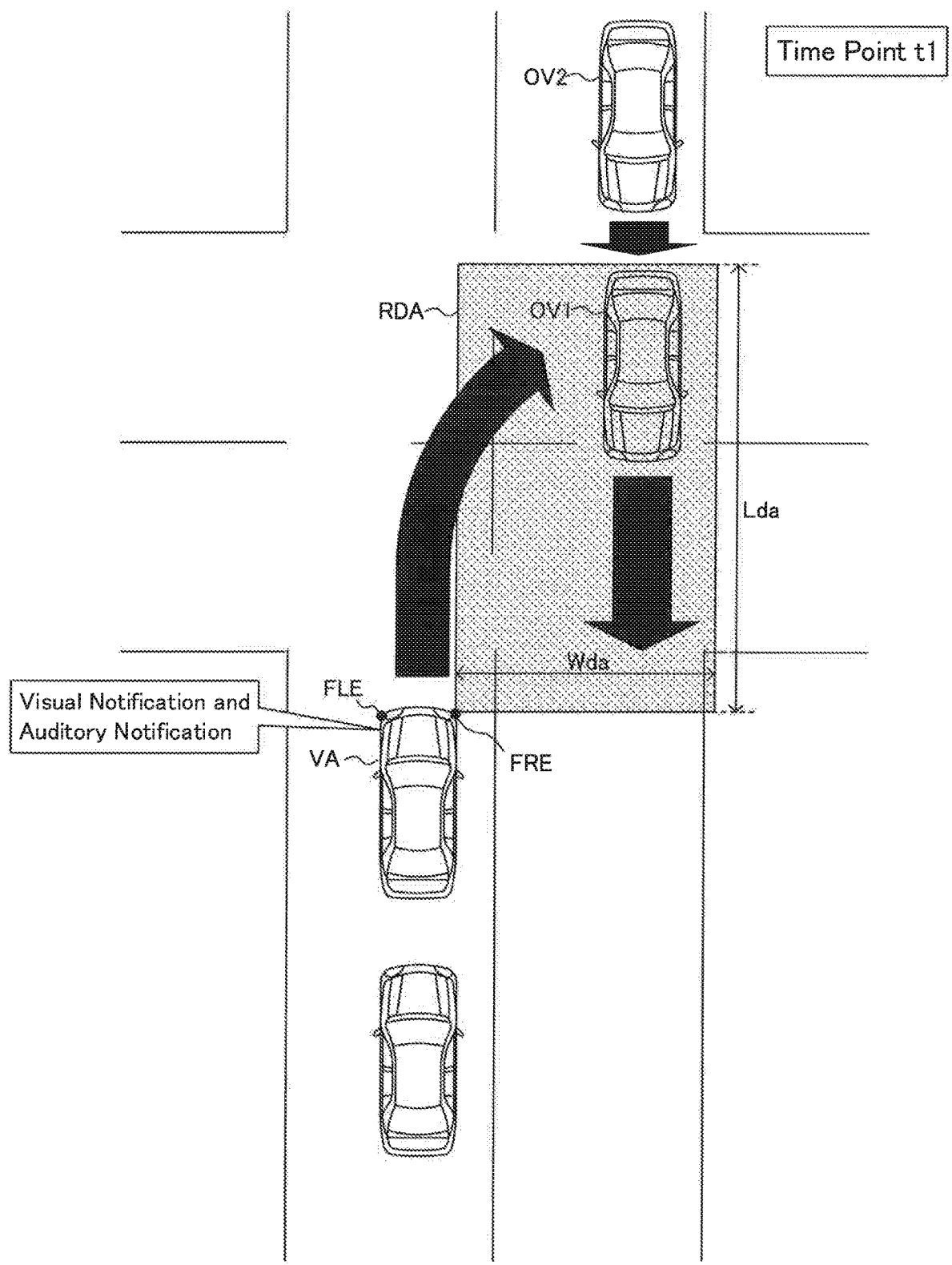
FIG. 2 is a plan view of a scene of intersection, and vehicles, in which he present notification apparatus performs a both-notification.

At a time point t1 in the example shown in FIG. 2, the ECU 20 detects an other vehicle OV1 located in the right detection area RDA as the obstacle. It is now assumed that the ECU 20 has detected the other vehicle OV1 as the obstacle for the first time at the time point t1 in a blinking period (turn signal indicator activation/operation period) of the right direction turn signal indicator 40R from a time point at which the right direction turn signal indicator 40R has started to be blinked (namely, when the operation element 36 is operated so as to move downward from the neutral position) to a time point at which blinking the right direction turn signal indicator 40R is ended. In this case, the ECU 20 starts both of an auditory notification (i.e., a process for giving a notification using auditory perception) and a visual notification (i.e., a process for giving a notification using visual perception). The ECU 20 performs the auditory notification through letting the speaker 60 generate the alert sound. The ECU 20 performs the visual notification through letting the display 50 display a display element indicating/ informing that the obstacle is present when making a right turn or a left turn. It should be noted that a notification including the auditory notification and the visual notification that are given simultaneously is sometimes referred to as a "both-notification". When a predetermined both-notification completion condition becomes satisfied, the ECU 20 ends/finishes the both-notification. An example of the both-notification completion condition is a condition that becomes satisfied when a predetermined notification time length elapses from a time point at which the both-notification was started.

Figure 3:
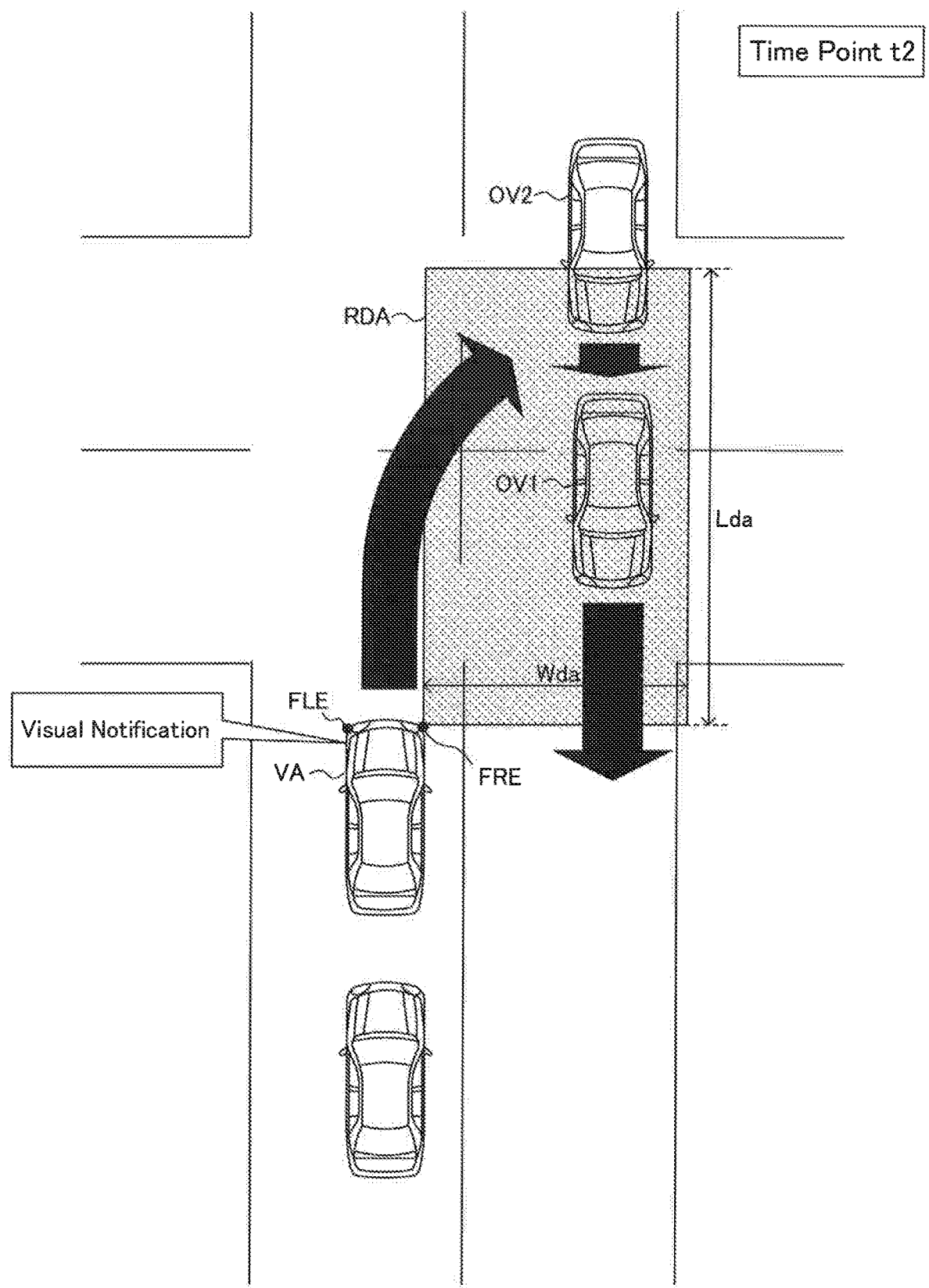
FIG. 3 is a plan view of a scene of the intersection, and the vehicles, in which the present notification apparatus performs a single-notification.

As shown in FIG. 3, at a time point t2 at which the predetermined notification time length elapses from the time point t1, the ECU 20 detects, as the obstacle, each of the other vehicle OV1 and an other vehicle OV2, since the both of the vehicle OV1 and the vehicle OV2 are located in the right detection area RDA. The ECU 20 has been successively (continuously) detecting the other vehicle OV1 as the obstacle in a period from the time point t1 to the time point t2.

The detection of the obstacle at the time point t2 is made after the both-notification completion condition has become satisfied (i.e., after the both-notification has been ended) in the turn signal indicator activation period. The ECU 20 performs the visual notification only without performing the auditory notification, when the ECU 20 detects an obstacle after a time point at which the both-notification completion condition has become satisfied in the turn signal indicator activation period. It should be noted that a notification that includes the visual notification only and that does not include the auditory notification is sometimes referred to as a "single-notification".

As understood from the above, the ECU 20 does not continue performing/giving the auditory notification for an excessively long period, the ECU 20 can reduce a possibility that the driver feels annoyed with the auditory notification.
(Specific Operation)
<Routine for Determination of Satisfaction of a Start Condition and an End Condition>

Hereinafter, the CPU of the ECU 20 is simply referred to as "the CPU" unless otherwise specified. The CPU executes a "routine for determination of satisfaction of a start condition and an end condition" shown by a flowchart in FIG. 4 every time a predetermined time elapses.

Figure 4:
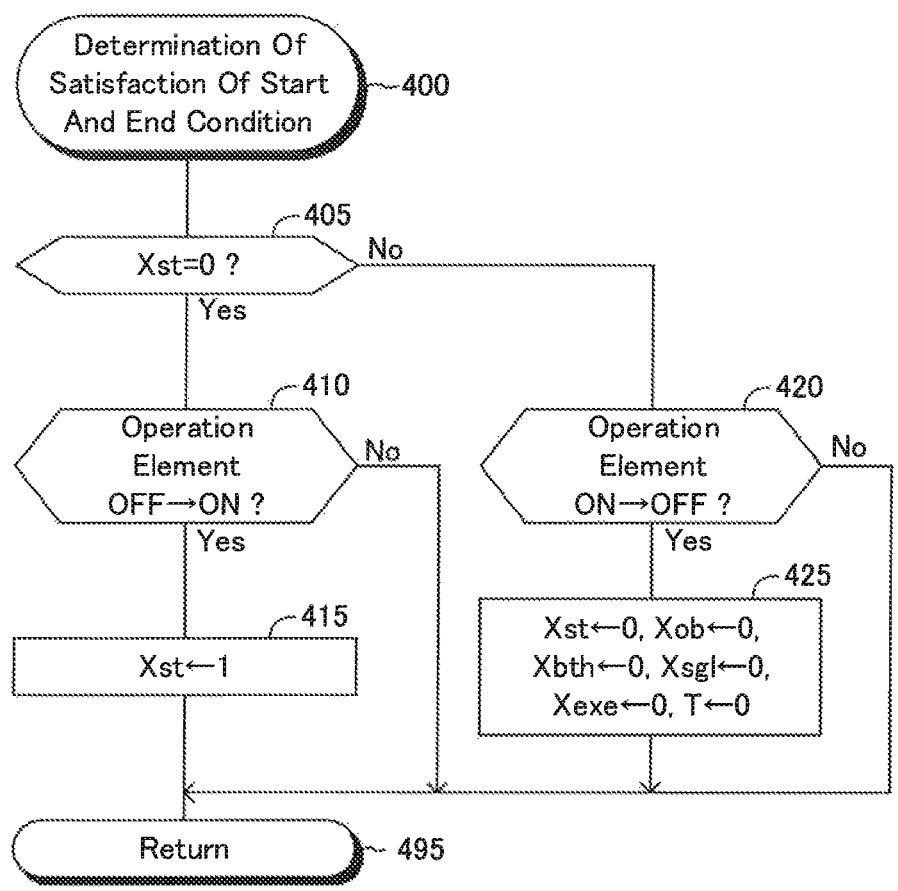
FIG. 4 is a flowchart representing a "routine for determination of satisfaction of a start condition and an end condition" executed by a CPU of the ECU shown in FIG. 1.

At an appropriate time point, the CPU starts processing from step 400 shown in FIG. 4, and proceeds to step 405 so as to determine whether or not a value of a start flag Xst is "0".

The value of the start flag Xst is set to "1" when any one of the turn signal indicators 40L and 40R is made to start blinking (refer to step 415 described later), and is set to "0" when one of the turn signal indicators 40L and 40R that has been blinking is made to stop blinking (refer to step 425 described later). Furthermore, the value of the start flag Xst is set to "0" through an unillustrated initialization routine executed by the CPU when a position of an unillustrated ignition key switch of the vehicle VA is changed from an off position to an on position.

When the value of the start flag Xst is "0", the CPU makes a "Yes" determination at step 405, and proceeds to step 410. At step 410, the CPU determines whether or not a state of the operation element 36 has changed from an off state to an on state. Namely, the CPU determines whether or not the operation element 36 has been operated either upward or downward from the neutral position. In other words, the CPU determines whether or not either one of the left direction turn signal indicator 40L and the right direction turn signal indicator 40R is made to start blinking.

When the state of the operation element 36 has not changed from the off state to the on state, the CPU makes a "No" determination at step 410, and proceeds to step 495 to terminate the present routine tentatively.

Whereas, when the state of the operation element 36 has changed from the off state to the on state (i.e., when either one of the left direction turn signal indicator 40L and the right direction turn signal indicator 40R has been made to start blinking) at the time point at which the CPU proceeds to step 410, the CPU makes a "Yes" determination at step 410, and proceeds to step 415 so as to set the value of the start flag Xst to "1". Thereafter, the CPU proceeds to step 495 to terminate the present routine tentatively.

When the value of the start flag Xst is "1" at the time point at which the CPU proceeds to step 405, the CPU makes a "No" determination at step 405, and proceeds to step 420. At step 420, the CPU determines whether or not the state of the operation element 36 has changed from the on state to the off state. Namely, the CPU determines whether or not the operation element 36 has returned to the neutral position, and thus, blinking the turn signal indicator has been made to end.

When the state of the operation element 36 has changed from the on state to the off state, an end condition becomes satisfied. In this case, the CPU makes a "Yes" determination at step 420, and proceeds to step 425. At step 425, the CPU sets the values of flags (i.e., the flag Xst, a flag Xob, a flag Xbth, a flag Xsgl, and a flag Xexe) to "0", and sets a value of a timer T to "0". Thereafter, the CPU proceeds to step 495 to terminate the present routine tentatively. The flags other than the flag Xst and the timer will be described later.

In contrast, when the state of the operation element 36 has not changed from the on state to the off state, the end condition does not become satisfied. In this case, the CPU makes a "No" determination at step 420, and proceeds to step 495 to terminate the present routine tentatively.
<Obstacle Detection Routine>

Figure 5:
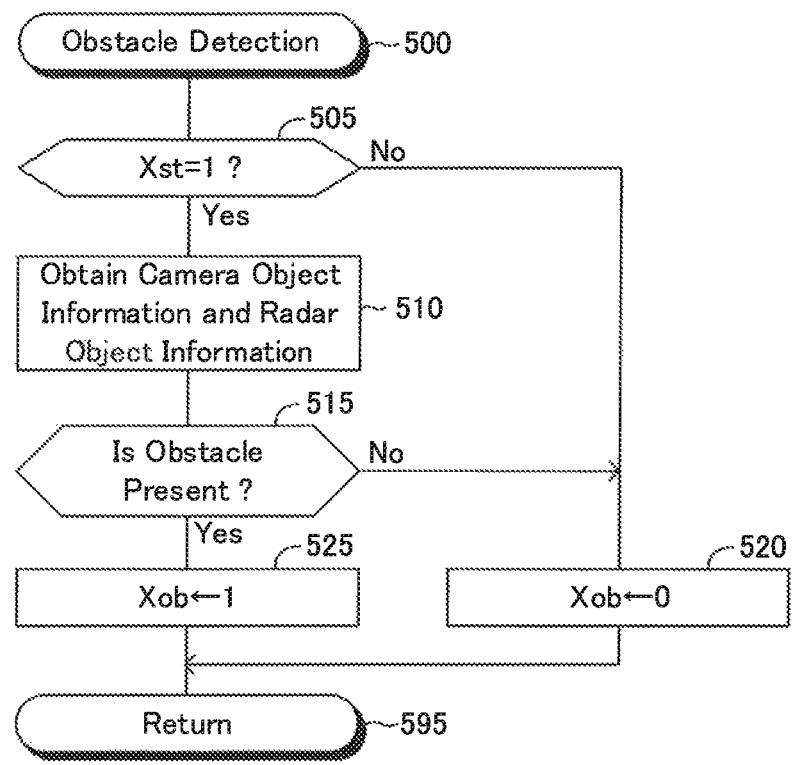
FIG. 5 is a flowchart representing an obstacle detection routine executed by the CPU of the ECU shown in FIG. 1.

The CPU executes an "obstacle detection routine" shown by a flowchart in FIG. 5 every time the predetermined time elapses.

At an appropriate time point, the CPU starts processing from step 500 shown in FIG. 5, and proceeds to step 505 so as to determine whether or not the value of the start flag Xst is "1". When the value of the start flag Xst is "1", the CPU makes a "Yes" determination at step 505 so as to execute processes of step 510 and step 515 in this order.

Step 510: The CPU obtains the camera object information from the camera device 32 and obtains the radar object information from the millimeter-wave radar device 34.

Step 515: The CPU determines whether or not the obstacle is present (i.e., the CPU has detected the obstacle) based on the camera object information and the radar object information. This process for detecting the obstacle has been described above, and thus, the description for the process is omitted.

When the obstacle is not present, the CPU makes a "No" determination at step 515, and executes a process of step 520 described below. Thereafter, the CPU proceeds to step 595 to terminate the present routine tentatively.

Step 520: The CPU sets a value of an obstacle flag Xob to "0".

The value of the obstacle flag Xob is set to "1" (refer to step 525 described later) when it is determined that the obstacle is present at step 515. The value of the obstacle flag Xob is set to "0" when it is determined that the obstacle is not present at step 515. The value of the obstacle flag Xob is set to "0" at step 425 shown in FIG. 4 and through the initialization routine.

Whereas, when the obstacle is present at the time point at which the CPU proceeds to step 515, the CPU makes a "Yes" determination at step 515, and proceeds to step 525 so as to set the value of the obstacle flag Xob to "1". Thereafter, the CPU proceeds to step 595 to terminate the present routine tentatively.

When the value of the start flag Xst is "0" at the at the time point at which the CPU proceeds to step 505, the CPU makes a "No" determination at step 505, and proceeds to step 520.

<Flag Setting Routine>

Figure 6:
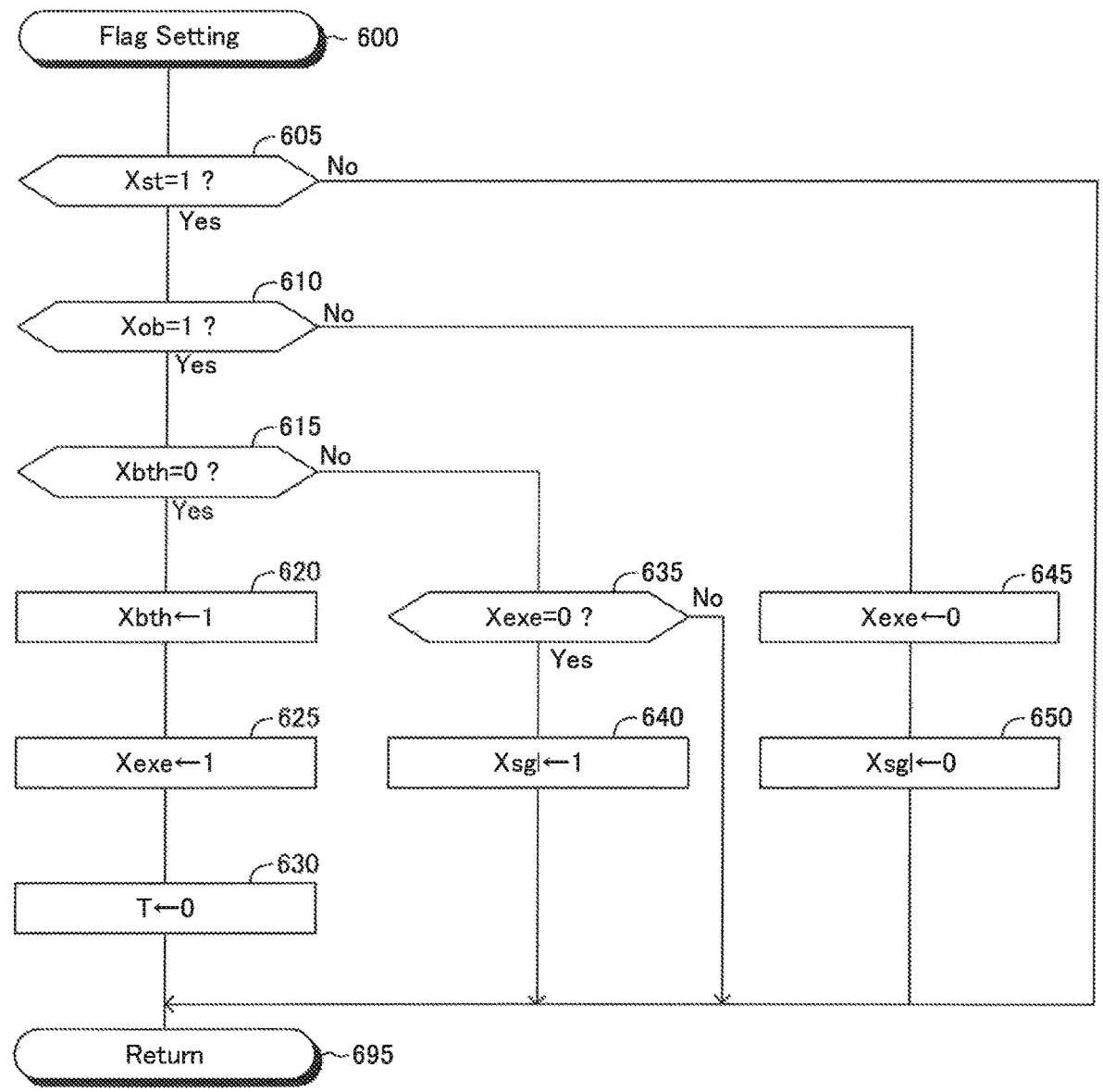
FIG. 6 is a flowchart representing a flag setting routine executed by the CPU of the ECU shown in FIG. 1.

The CPU executes a "flag setting routine" shown by a flowchart in FIG. 6 every time the predetermined time elapses.

At an appropriate time point, the CPU starts processing from step 600 shown in FIG. 6, and proceeds to step 605 so as to determine whether or not the value of the start flag Xst is "1". When the value of the start flag Xst is "1", the CPU makes a "Yes" determination at step 605 so as to proceed to step 610.

At step 610, the CPU determines whether or not the value of the obstacle flag Xob is "1". When the value of the obstacle flag Xob is "1" the CPU makes a "Yes" determination at step 610 so as to proceed to step 615. At step 615, the CPU determines whether or not a value of the both flag Xbth is "0".

The value of the both flag Xbth is set to "1" (refer to step 630 described later) when the obstacle is detected for the first time in the turn signal indicator activation period which starts from the time point at which the value of the start flag Xst is changed from "0" to "1" (i.e., the start time point at which either one of the turn signal indicators 40L, 40R starts blinking) and in which the value of the start flag Xst is maintained at "1. The value of the both flag Xbth is set to "0" (refer to step 425 shown in FIG. 4) when the value of the start flag Xst is changed from "1" to "0" (i.e., when one of the turn signal indicators 40L and 40R that has been blinking is made to stop blinking. Furthermore, the value of the both flag Xbth is set to "0" through the initialization routine.

When the value of the both flag Xbth is "0", the CPU makes a "Yes" determination at step 615, and executes processes of step 620 to step 630 in this order, and then proceeds to step 595 to terminate the present routine tentatively.

Step 620: The CPU sets the value of the both flag Xbth to "1".

Step 625: The CPU sets the value of the execution flag Xexe to "1".

The value of the execution flag Xexe is set to "1" (refer to step 625) when a start condition of the both-notification (both-notification start condition) becomes satisfied (that is when the value of the both flag Xbth is changed from "0" to "1", namely, when the obstacle is detected for the first time in the turn signal indicator activation period. The value of the execution flag Xexe is set to "0" (refer to step 725 shown in FIG. 7 and step 645 shown in FIG. 6) when the both-notification end condition becomes satisfied (i.e., the time point at which the notification time length has elapsed since the both-notification was started so that the both-notification end condition becomes satisfied, or the time point at which the obstacle is no longer present in the turn signal indicator activation period, whichever comes first). The value of the execution flag Xexe is set to "0" at step 425 shown in FIG. 4 and through the initialization routine.

Step 630: The CPU sets the value of the timer T to "0". The timer T is a timer for counting/measuring an elapsed time from the start of the both-notification (i.e., an elapsed time from the time point at which the both-notification is started).

Thereafter, when the CPU proceeds to step 615, the CPU makes a "No" determination at step 615 since the value of the both flag Xbth is "1", and the CPU proceeds to step 635. At step 635, the CPU determines whether or not the value of the execution flag Xexe is "0". In this case, since the value of the execution flag Xexe is "1", the CPU makes a "No" determination, and proceeds to step 695 to terminate the present routine tentatively. Whereas, when the value of the execution flag Xexe is "0", the CPU makes a "Yes" determination at step 635, and executes a process of step 640 described below. Thereafter, the CPU proceeds to step 695 to terminate the present routine tentatively.

Step 640: The CPU sets the value of the single flag Xsgl to "1".

The value of the single flag Xsgl is set to "1" (refer to step 640) when the object is detected after the both-notification is made to end once in the turn signal indicator activation period. The value of the single flag Xsgl is set to "0" (refer to step 645 described later) when it is determined that no obstacle is present in the turn signal indicator activation period. Furthermore, the value of the single flag Xsgl is set to "0" at step 425 shown in FIG. 4 and through the initialization routine. It should be noted that the CPU performs the single-notification when the single flag Xsgl is "1".

When the CPU determines that the value of the obstacle flag Xob is "0" at the time point at which the CPU proceeds to step 610, the CPU executes process of step 645 and step 650, in this order. Thereafter, the CPU proceeds to step 695 to terminate the present routine tentatively.

Step 645: The CPU sets the value of the execution flag Xexe to "0".

Step 650: The CPU sets the value of the single flag Xsgl to "0".

<Both-Notification Routine>

Figure 7:
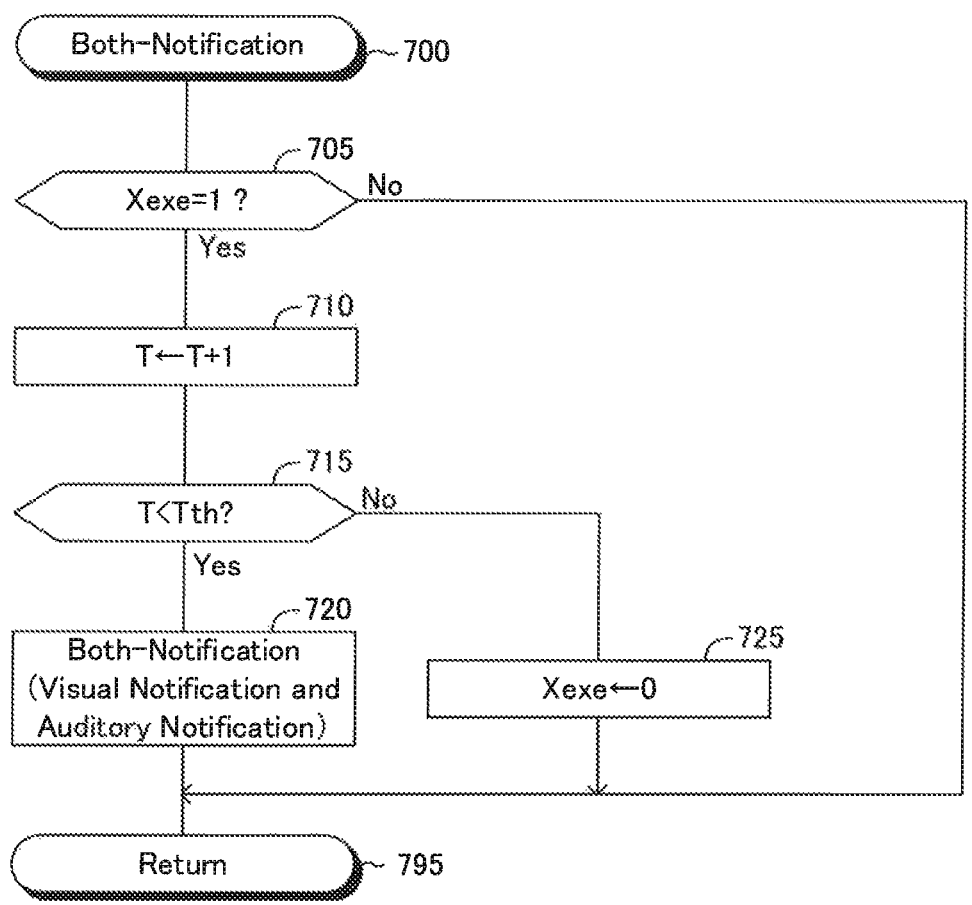
FIG. 7 is a flowchart representing a both-notification routine executed by the CPU of the ECU shown in FIG. 1.

The CPU executes a "both-notification routine" shown by a flowchart in FIG. 7 every time the predetermined time elapses.

At an appropriate time point, the CPU starts processing from step 700 shown in FIG. 7, and proceeds to step 705 so as to determine whether or not the value of the execution flag Xexe is "1". When the value of the execution flag Xexe is "1", the CPU makes a "Yes" determination at step 705, and execute processes of step 710 and step 715 described below.

Step 710: The CPU adds "1" to the value of the timer T.

Step 715: The CPU determines whether or not the value of the timer T is equal to or smaller than a threshold Tth. The threshold Tth has been set to a value that is equal to the value of the timer of when the notification time length elapses from the start of the both-notification (i.e., from the time point at which the both-notification is started).

When the value of the timer T is equal to or smaller than the threshold Tth, the CPU makes a "Yes" determination at step 715, and proceeds to step 720 so as to perform the both-notification. Thereafter, the CPU proceeds to step 795 to terminate the present routine tentatively.

Whereas, when the value of the timer T is larger than the threshold Tth, the CPU makes a "No" determination at step 715, and proceeds to step 725 so as to set the value of the execution flag Xexe to "0". Thereafter, the CPU proceeds to step 795 to terminate the present routine tentatively.

When the value of the execution flag Xexe is "0" at the time point at which the CPU proceeds to step 705, the CPU makes a "No" determination at step 705. Thereafter, the CPU proceeds to step 795 to terminate the present routine tentatively.

<Single-Notification Routine>

Figure 8:
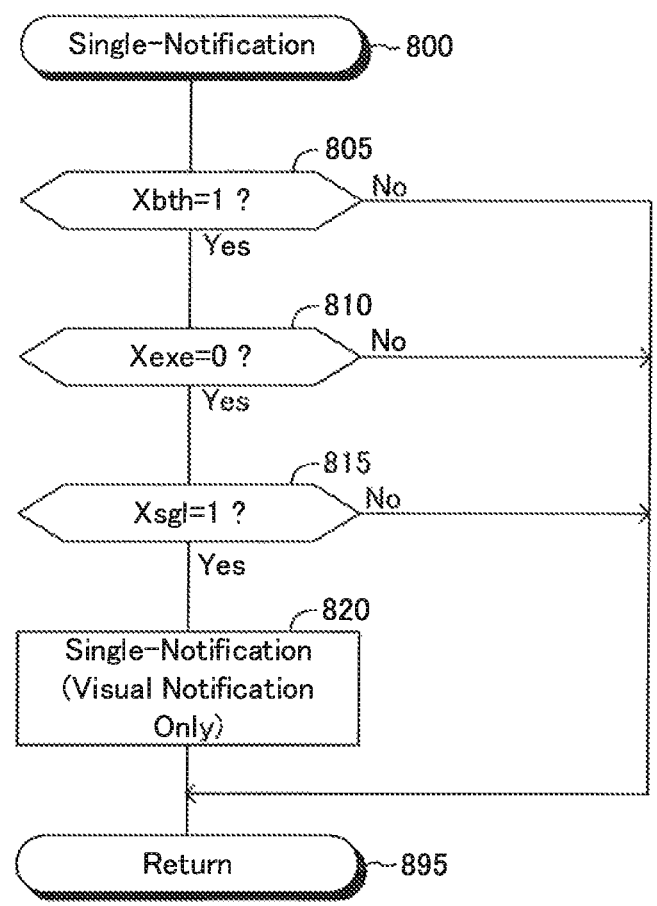
FIG. 8 is a flowchart representing a single-notification routine executed by the CPU of the ECU shown in FIG. 1.

The CPU executes a "single-notification routine" shown by a flowchart in FIG. 8 every time the predetermined time elapses.

At an appropriate time point, the CPU starts processing from step 800 shown in FIG. 8, and proceeds to step 805 so as to determine whether or not the value of the both flag Xbth is "1". When the value of the both flag Xbth is "1", the CPU makes a "Yes" determination at step 805, and proceeds to step 810.

At step 810, the CPU determines whether or not the value of the execution flag Xexe is "0". When the value of the execution flag Xexe is "0", the CPU makes a "Yes" determination at step 810, and proceeds to step 815.

At step 815, the CPU determines whether or not the value of the single flag Xsgl is "1". When the value of the single flag Xsgl is "1", the CPU makes a "Yes" determination at step 815, and proceeds to step 825 so as to perform the single-notification. Thereafter, the CPU proceeds to step 895 to terminate the present routine tentatively.

When the value of the both flag Xbth is "0", the CPU makes a "No" determination at step 805, and proceeds to step 895 to terminate the present routine tentatively.

When the value of the execution flag Xexe is "1", the CPU makes a "No" determination at step 810, and proceeds to step 895 to terminate the present routine tentatively.

When the value of the single flag Xsgl is "0", the CPU makes a "No" determination at step 815, and proceeds to step 895 to terminate the present routine tentatively.

As understood from the above, the present notification apparatus 10 performs/gives the both-notification when the present notification apparatus 10 detects the obstacle for the first time in the turn signal indicator activation period. The present notification apparatus 10 performs/gives the single-notification instead of the both-notification, when the present notification apparatus 10 detects the obstacle after the both-notification is made to end owing to the satisfaction of the both-notification completion condition. Accordingly, the present notification apparatus 10 can increase the ability/possibility of letting the driver pay attention to the obstacle and can decrease the possibility that the driver feels annoyed with the auditory notification given by (or using) the auditory notification device.

(First Modification)

The ECU 20 of the first modification performs/gives the both-notification when at least one of initialization conditions A1 and A2 becomes satisfied and then the ECU 20 detects the obstacle, after the both-notification completion condition became satisfied, in the turn signal indicator activation period.

Initialization condition A1: The initialization condition A1 becomes satisfied when no-detection-state that is a state where no obstacle is detected continues for a predetermined time.

Initialization condition A2: The initialization condition A2 becomes satisfied when the driver has looked away.

Figure 9:
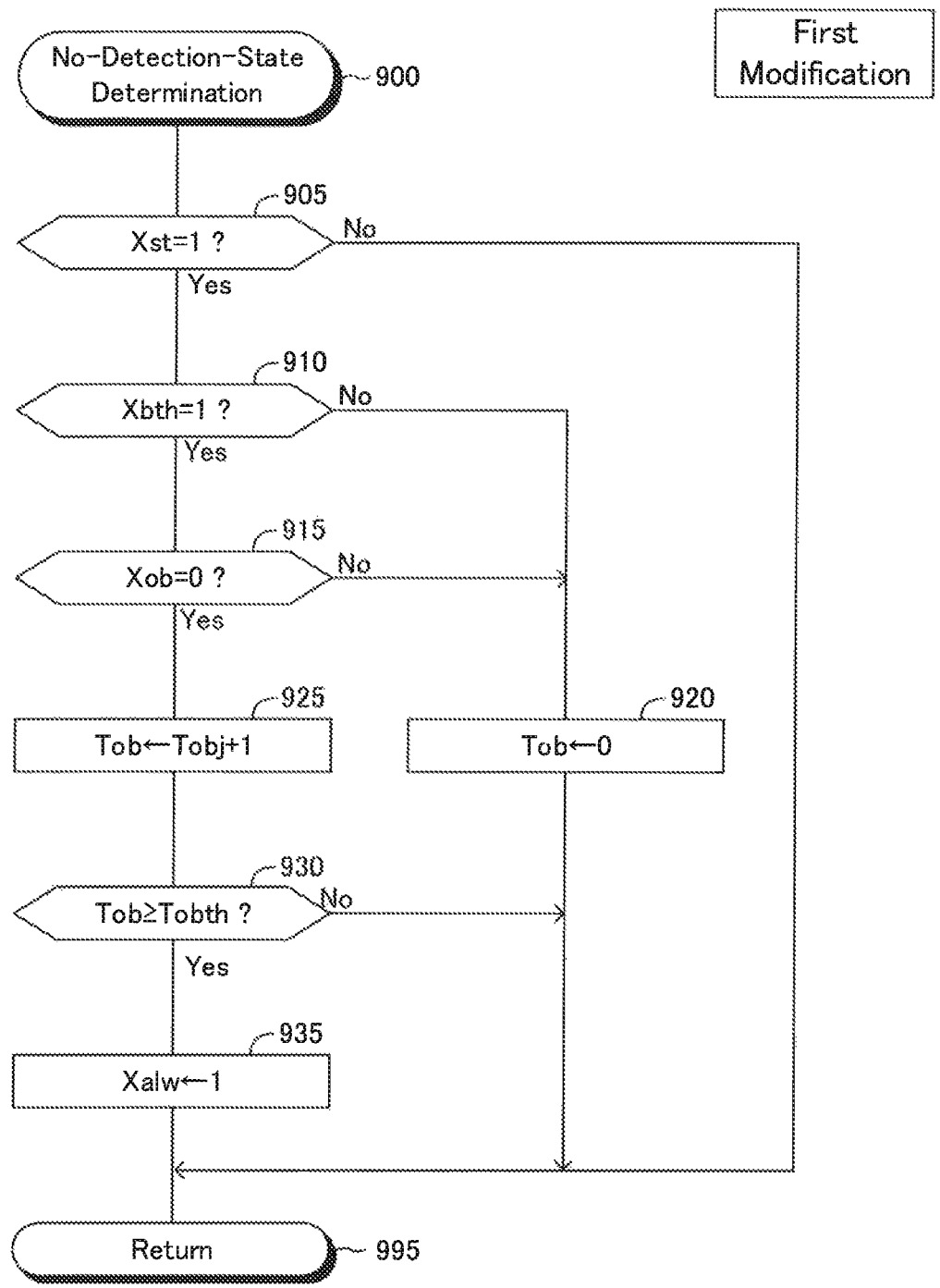
FIG. 9 is a flowchart representing a no-detection-state determination routine executed by a CPU of the ECU of a first modification according to the embodiment of the present disclosure.
Figure 10:
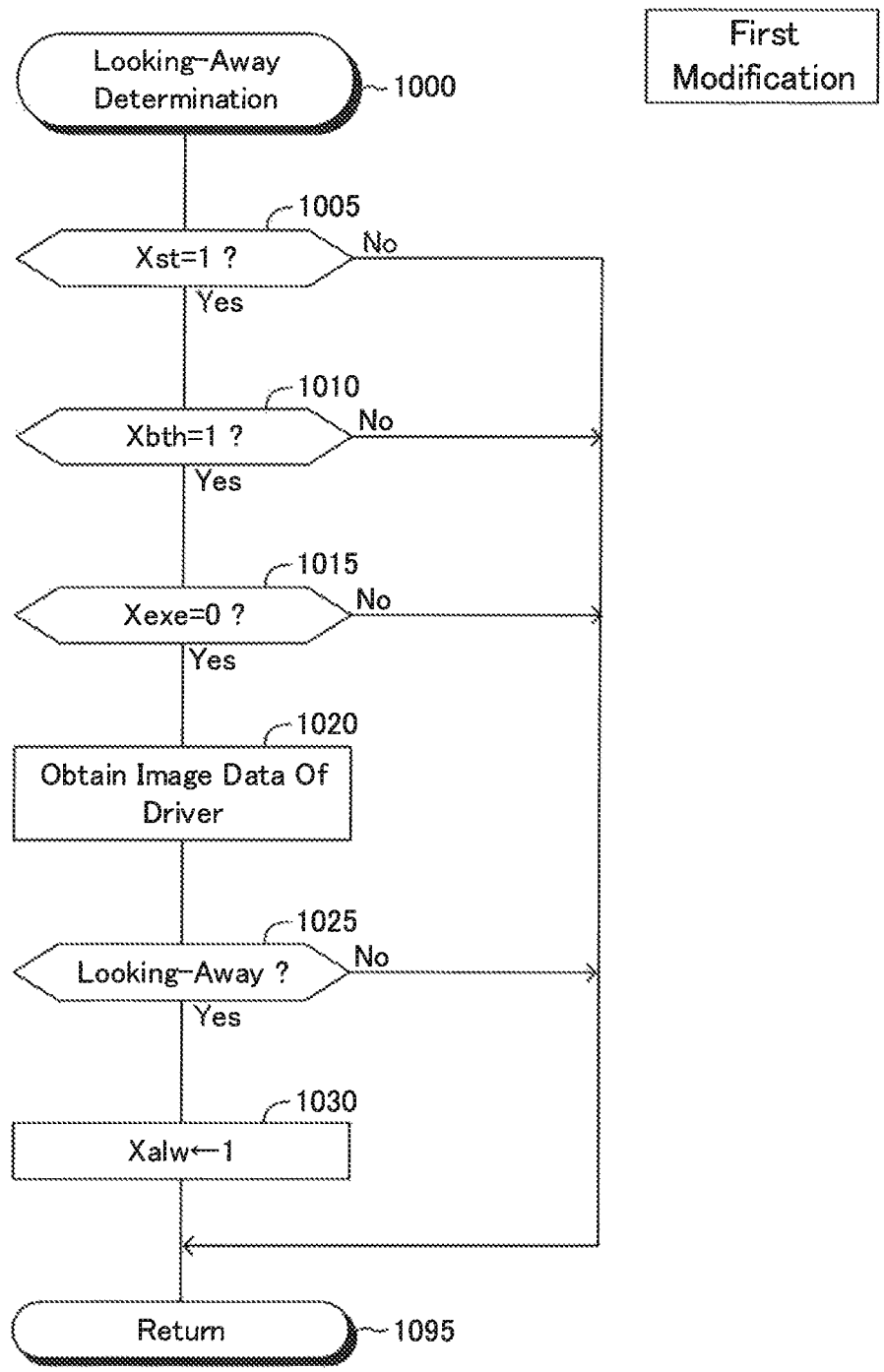
FIG. 10 is a flowchart representing a looking-away determination routine executed by the CPU of the ECU of the first modification according to the embodiment of the present disclosure.
Figure 11:
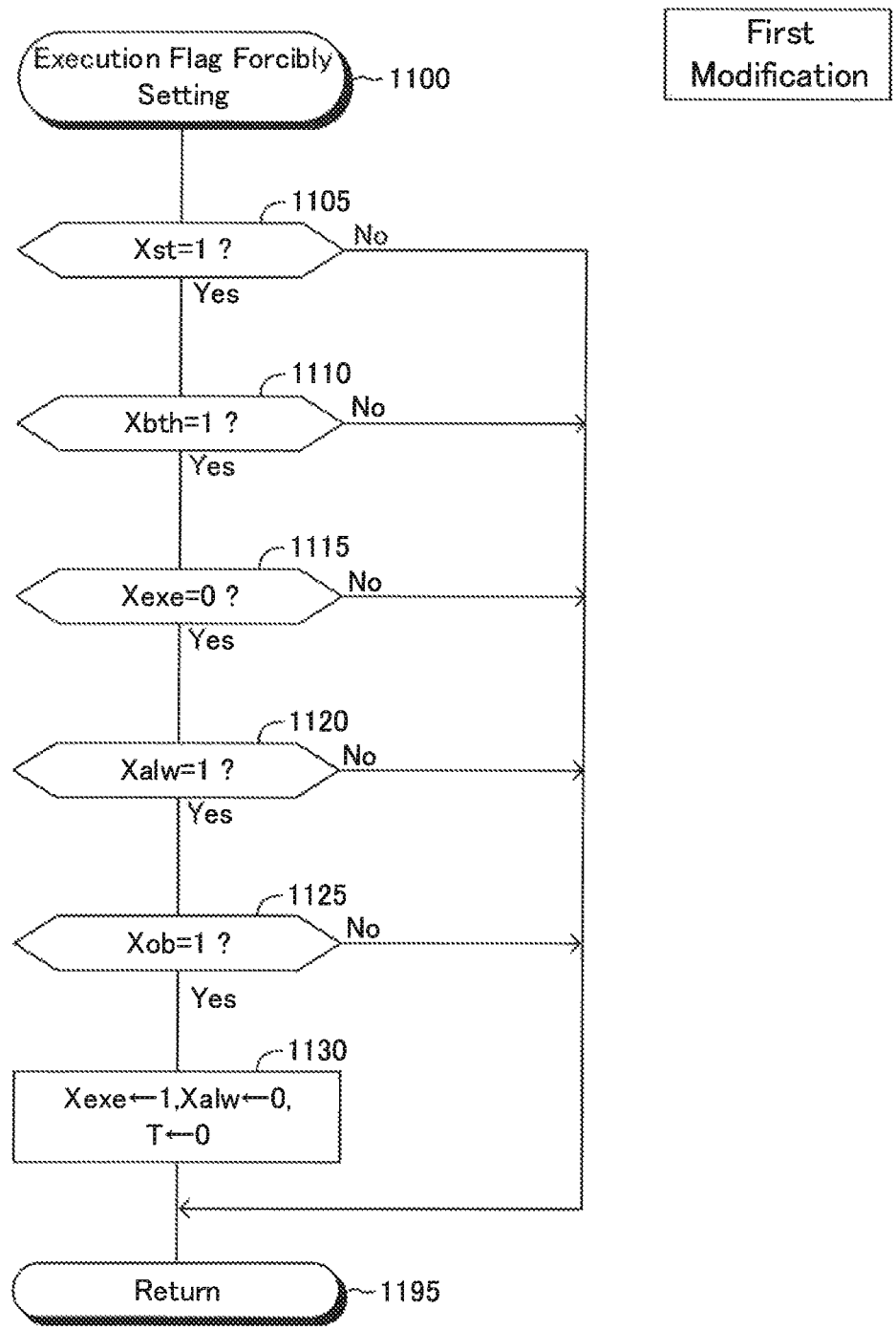
FIG. 11 is a flowchart representing an execution flag forcibly setting routine executed by the CPU of the ECU of the first modification according to the embodiment of the present disclosure.

The CPU of the ECU 20 of the first modification executes routines shown in FIGS. 9 to 11 in place of the routines shown in FIGS. 4 to 8, respectively.

<No-Detection-State Determination Routine>

The CPU executes a "no-detection-state determination routine" shown by a flowchart in FIG. 9 every time the predetermined time elapses.

At an appropriate time point, the CPU starts processing from step 900 shown in FIG. 9, and proceeds to step 905 so as to determine whether or not the value of the start flag Xst is "1". When the value of the start flag Xst is "1", the CPU makes a "Yes" determination at step 905, and proceeds to step 910.

At step 910, the CPU determines whether or not the value of the both flag Xbth is "1". When the value of the both flag Xbth is "1", the CPU makes a "Yes" determination at step 910, and proceeds to step 915.

At step 915, CPU determines whether or not the value of the obstacle flag Xob is "0". When the value of the obstacle flag Xob is "1", the CPU makes a "No" determination at step 915, and proceeds to step 920. At step 920, the CPU sets the value of a no-detection-state timer Tob to "0", and proceeds to step 995 to terminate the present routine tentatively. It should be noted that the no-detection-state timer Tob is a timer for counting/measuring a duration time of the no-detection-state in which no obstacle is determined to be detected.

Whereas, when the value of the obstacle flag Xob is "0" at the time point the CPU proceeds to step 915, the CPU makes a "Yes" determination at step 915, and executes processes of step 925 and step 930 described below.

Step 925: The CPU adds "1" to the no-detection-state timer Tob.

Step 930: The CPU determines whether or not the value of the no-detection-state timer Tob is equal to or larger than a threshold tobth. The threshold Tobth has been set to a value that is equal to the value of the no-detection-state timer Tob of when the no-detection-state continues for the predetermined time (refer to the initialization condition A1 described above).

When the value of the no-detection-state timer Tob is smaller than the threshold tobth, the CPU makes a "No" determination at step 930, and proceeds to step 995 to terminate the present routine tentatively.

Whereas, the value of the no-detection-state timer Tob is equal to or larger than the threshold tobth (i.e., when the initialization condition A1 described above becomes satisfied), the CPU makes a "Yes" determination at step 930, and proceeds to step 935. At step 935, the CPU sets a value of an allowance flag Xalw to "1", and proceeds to step 995 to terminate the present routine tentatively.

The value of the allowance flag Xalw is set to "1" when at least one of the initialization conditions A1 and A2 is satisfied (refer to step 935, and step 1030 shown in FIG. 10). The value of the allowance flag Xalw is set to "0" at step 425 shown in FIG. 4, at step 1130 shown in FIG. 11, and through the initialization routine.

Whereas, when the value of the both flag Xbth is "0" at the time point the CPU proceeds to step 910, the CPU makes a "No" determination at step 910, and proceeds to step 920.

Furthermore, when the value of the start flag Xst is "0" at the time point the CPU proceeds to step 905, the CPU makes a "No" determination at step 905, and proceeds to step 995 to terminate the present routine tentatively.

<Looking-Away Determination Routine>

The CPU executes a "looking-away determination routine" shown by a flowchart in FIG. 10 every time the predetermined time elapses.

At an appropriate time point, the CPU starts processing from step 1000 shown in FIG. 10, and proceeds to step 1005 so as to determine whether or not the value of the start flag Xst is "1". When the value of the start flag Xst is "1", the CPU makes a "Yes" determination at step 1005, and proceeds to step 1010.

At step 1010, the CPU determines whether or not the value of the both flag Xbth is "1". When the value of the both flag Xbth is "1", the CPU makes a "Yes" determination at step 1010, and proceeds to step 1015.

At step 1015, the CPU determines whether or not the value of the execution flag Xexe is "0". When the value of the execution flag Xexe is "0", the CPU makes a "Yes" determination at step 1015, and executes processes of step 1020 and step 1025 described below.

Step 1020: The CPU obtains the image data of the driver from the monitoring camera device 38.

Step 1025: The CPU determines, based on the image data of the driver, whether or not the driver looks away (i.e., the driver is not keeping his/her eye on the road). More specifically, the CPU specifies, based on the image data of the driver, a direction of the driver's face (or a direction of line of sight of the driver), and determines that the driver looks away when the direction of the driver's face (or the direction of line of sight of the driver) is a direction other than a direction to which the driver should pay attention. The direction to which the driver should pay attention is a direction to the obstacle.

When the CPU determines that the driver is not looking away, the CPU makes a "No" determination at step 1025, and proceeds to step 1095 to terminate the present routine tentatively. Whereas, when the CPU determines that the driver is looking away (i.e., when the above-described initialization condition A2 becomes satisfied), the CPU makes a "Yes" determination at step 1025, and proceeds to step 1030. At step 1030, the CPU sets the value of the allowance flag Xalw to "1", and proceeds to step 1095 to terminate the present routine tentatively.

When the value of the start flag Xst is "0", the CPU makes a "No" determination at step 1005, and proceeds to step 1095 to terminate the present routine tentatively.

When the value of the both flag Xbth is "0", the CPU makes a "No" determination at step 1010, and proceeds to step 1095 to terminate the present routine tentatively.

When the value of the execution flag Xexe is "1", the CPU makes a "No" determination at step 1015, and proceeds to step 1095 to terminate the present routine tentatively.

<Execution Flag Forcibly Setting Routine>

The CPU executes an "execution flag forcibly setting routine" shown by a flowchart in FIG. 11 every time the predetermined time elapses.

At an appropriate time point, the CPU starts processing from step 1100 shown in FIG. 11, and proceeds to step 1105 so as to determine whether or not the value of the start flag Xst is "1". When the value of the start flag Xst is "1", the CPU makes a "Yes" determination at step 1105, and proceeds to step 1110.

At step 1110, the CPU determines whether or not the value of the both flag Xbth is "1". When the value of the both flag Xbth is "1", the CPU makes a "Yes" determination at step 1110, and proceeds to step 1115.

At step 1115, the CPU determines whether or not the value of the execution flag Xexe is "0". When the value of the execution flag Xexe is "0", the CPU makes a "Yes" determination at step 1115, and proceeds to step 1120.

At step 1120, the CPU determines whether or not the value of the allowance flag Xalw is "1". When the value of the allowance flag Xalw is "1", the CPU makes a "Yes" determination at step 1120, and proceeds to step 1125.

At step 1125, the CPU determines whether or not the value of the obstacle flag Xob is "1". When the value of the obstacle flag Xob is "1", the CPU makes a "Yes" determination at step 1125, and proceeds to step 1130. At step 1130, the CPU sets the value of the execution flag Xexe to "1", sets of the allowance flag Xalw to "0", and sets the value of the timer T to "0". Thereafter, the CPU proceeds to step 1195 to terminate the present routine tentatively.

By the above processes, the obstacle is again detected after at least one of initialization conditions A1 and A2 becomes satisfied, the value of the execution flag Xexe is set to "1" at step 1130. Accordingly, the both-notification is performed through the both-notification routine shown in FIG. 7.

When the value of the start flag Xst is "0", the CPU makes a "No" determination at step 1105, and proceeds to step 1195 to terminate the present routine tentatively.

When the value of the both flag Xbth is "0", the CPU makes a "No" determination at step 1110, and proceeds to step 1195 to terminate the present routine tentatively.

When the value of the execution flag Xexe is "1", the CPU makes a "No" determination at step 1115, and proceeds to step 1195 to terminate the present routine tentatively.

When the value of the allowance flag Xalw is "0", the CPU makes a "No" determination at step 1120, and proceeds to step 1195 to terminate the present routine tentatively.

When the value of the obstacle flag Xob is "0", the CPU makes a "No" determination at step 1125, and proceeds to step 1195 to terminate the present routine tentatively.

In the turn signal indicator activation period, after the both-notification ended, the driver's attentiveness to the obstacle may often decrease when at least one of initialization conditions A1 and A2 becomes satisfied. In view of the above, the ECU 20 of the first modification forcibly sets the value of the execution flag Xexe so as to perform/give the both-notification, when the ECU 20 detects the obstacle after at least one of the initialization conditions A1 and A2 becomes satisfied. Thus, the driver's attentiveness to the obstacle can be increased again.

(Second Modification)

The ECU 20 of the second modification determines that the both-notification completion condition becomes satisfied when the ECU 20 determines again that the obstacle is present after the ECU 20 has started the both-notification.

Figure 12:
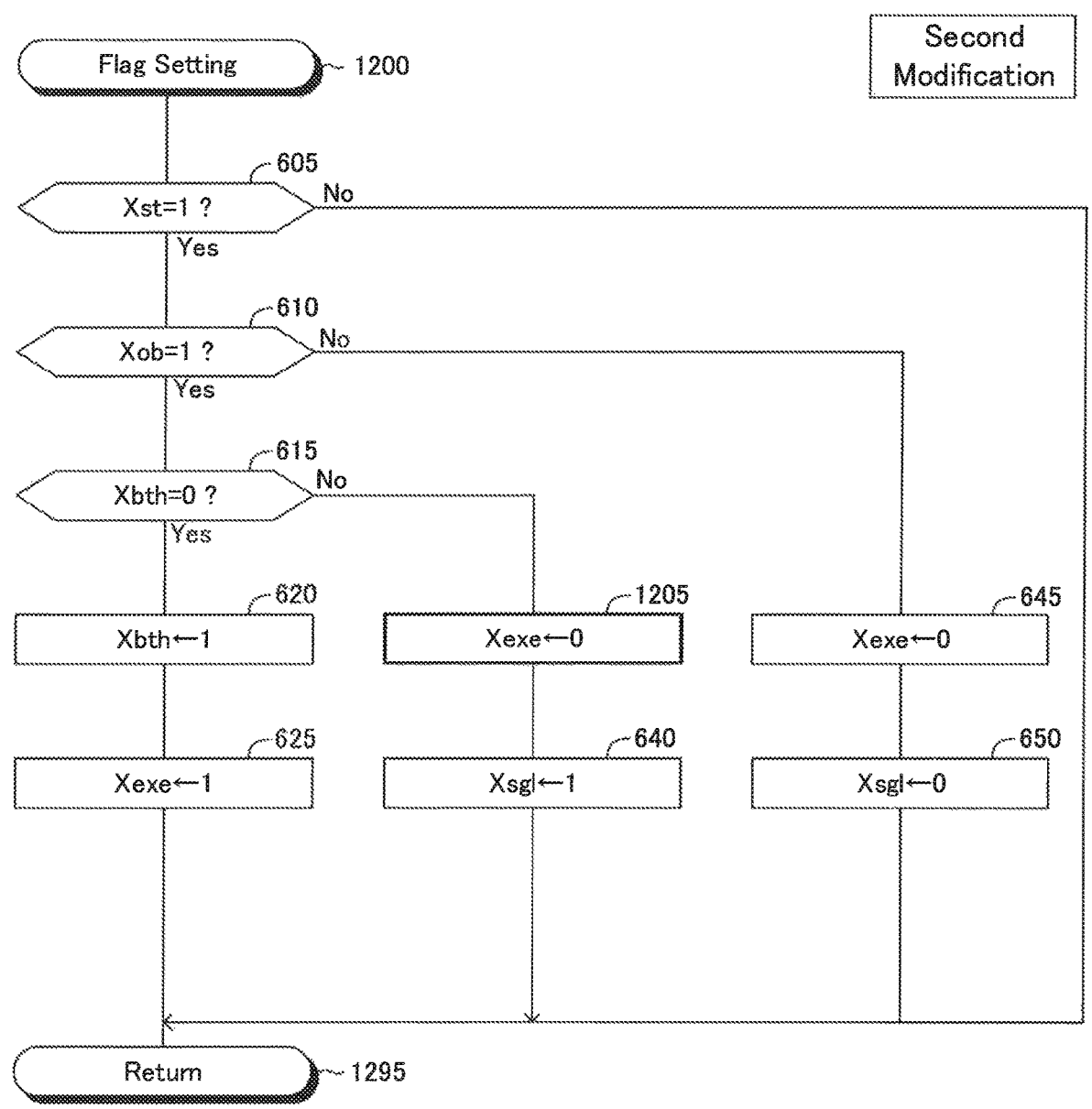
FIG. 12 is a flowchart representing a flag setting routine executed by a CPU of the ECU of a second modification according to the embodiment of the present disclosure.

The CPU of the ECU 20 of the second modification executes a flag setting routine shown in FIG. 12 in place of the flag setting routine shown in FIG. 6, every time the predetermined time elapses. It should be noted that each step shown in FIG. 12 at which the same processing is performed as each step shown in FIG. 6 is given the same step symbol as one given to such step shown in FIG. 6. The description thereof is omitted.

At an appropriate time point, the CPU starts processing from step 1200 shown in FIG. 12. When the CPU makes a "No" determination at step 615 shown in FIG. 12 after the CPU makes a "Yes" determination at each of step 605 shown in FIG. 12 and step 610 shown in FIG. 12, the CPU proceeds step 1205. At step 1205, the CPU sets the value of the execution flag Xexe to "0", and executes the process of step 640 shown in FIG. 12. Thereafter, the CPU proceeds to step 1295 to terminate the present routine tentatively.

In this manner, when the value of the obstacle flag Xob has been set to "1" owing to the detection of the obstacle after the value of the both flag Xbth was set to "1" owing to the first-time detection of the obstacle in the turn signal indicator activation period, the "No" determination is made at step 615 shown in FIG. 12 so that the value of the execution flag Xexe is set to "0" to cause the both-notification to end.

Figure 13:
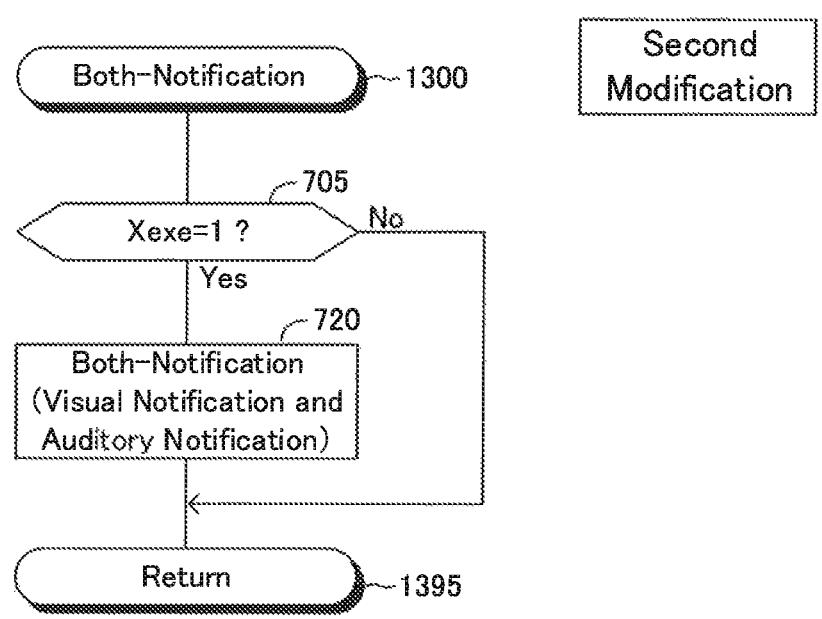
FIG. 13 is a flowchart representing a both-notification routine executed by the CPU of the ECU of the second modification according to the embodiment of the present disclosure.

Furthermore, the CPU of the ECU 20 of the second modification executes a both-notification routine shown in FIG. 13 in place of the both-notification routine shown in FIG. 7, every time the predetermined time elapses. It should be noted that each step shown in FIG. 13 at which the same processing is performed as each step shown in FIG. 7 is given the same step symbol as one given to such step shown in FIG. 7. The description thereof is omitted.

At an appropriate time point, the CPU starts processing from step 1300 shown in FIG. 13, and proceeds to step 705 shown in FIG. 13. When the CPU makes a "Yes" determination at step 705 shown in FIG. 13, the CPU proceeds to step 720 shown in FIG. 13 so as to perform/give the both-notification (without executing the processes of step 710 and step 715 shown in FIG. 7). Thereafter, the CPU proceeds to step 1395 to terminate the present routine tentatively.

Whereas, when the CPU makes a "No" determination at step 705 shown in FIG. 13, the CPU directly proceeds to step 1395 to terminate the present routine tentatively (without executing the process of step 725 shown in FIG. 7).

The present disclosure should not be limited to the above embodiments, and can employ various modifications without departing from the present disclosure.

For example, the ECU 20 detects, as the obstacle, the other vehicles OV1, OV2, however, the ECU 20 may detect as the obstacle, an object (e.g., a pedestrian) other than a vehicle.

The camera device 32 is not necessarily the stereo camera device, but may be a monocular camera device. The millimeter-wave radar device 34 may be replaced with a remote sensing device that transmits a radio wave other than the millimeter-wave and receives a reflected radio wave so as to detect an obstacle.

The present notification apparatus 10 does not necessarily include the millimeter-wave radar device 34, as long as the present notification apparatus 10 is configured to accurately specify/detect a position of an object with respect to the vehicle VA, based on the camera object information. Alternatively, the present notification apparatus 10 does not necessarily include the camera device 32, as long as the present notification apparatus 10 is configured to accurately specify/detect a position of an object with respect to the vehicle VA, based on the radar object information.

What is claimed is:

1. A vehicle notification apparatus comprising:
   an operation element operated by a driver of a vehicle in order for said driver to activate a turn signal indicator so as to indicate a turn direction of said vehicle;
   an information obtaining device configured to obtain surrounding information including information on an object present around said vehicle;
   an auditory notification device configured to be able to perform an auditory notification to said driver;
   a visual notification device configured to be able to perform a visual notification to said driver; and
   a control unit configured to:
      determine, based on said surrounding information, whether or not an obstacle that has a likelihood of colliding with said vehicle is present every time a predetermined time elapses, in a period in which said turn signal indicator are being activated;
      perform a both-notification to let both of said auditory notification device and said visual notification device perform said auditory notification and said visual notification, respectively, until a predetermined both-notification completion condition becomes satisfied from a time point at which it is determined for the first time that said obstacle is present after said turn signal indicator starts to be activated in said period in which said turn signal indicator is being activated; and
      perform a single-notification to let said visual notification device perform said visual notification without letting said auditory notification device perform said auditory notification, when it is again determined that said obstacle is present after said both-notification completion condition becomes satisfied, in said period in which said turn signal indicator is being activated.

2. The vehicle notification apparatus according to claim 1, wherein,
   said control unit is configured to:
      determine that said both-notification completion condition becomes satisfied when a predetermined notification time length elapses from a start of said both-notification.

3. The vehicle notification apparatus according to claim 1, wherein,
   said control unit is configured to:
      determine that said both-notification completion condition becomes satisfied and perform said single-notification, when it is again determined that said obstacle is present after a start of said both-notification.

4. The vehicle notification apparatus according to claim 1, wherein,
   said control unit is configured to:
      perform again said both-notification, when it is determined that said obstacle is present after a state where no obstacle is determined to be present continues for a predetermined time or more after said both-notification completion condition becomes satisfied, in said period in which said turn signal indicator is being activated.

5. The vehicle notification apparatus according to claim 1, further comprising a driver monitoring camera device configured to obtain image data of said driver sitting on a driver's seat of said vehicle,
   wherein
   said control unit is configured to:
      perform again said both-notification, when it is determined that said obstacle is present after it is determined, based on image data of said driver, that said driver looks in a predetermined direction other than a direction to which said driver should pay attention after said both-notification completion condition becomes satisfied, in said period in which said turn signal indicator is being activated.

* * * * *